(12) United States Patent (10) Patent No.: US 8,350,935 B2
Kim et al. (45) Date of Patent: Jan. 8, 2013

(54) COLOR FILTER ARRAY, IMAGE SENSOR INCLUDING THE COLOR FILTER ARRAY AND SYSTEM INCLUDING THE IMAGE SENSOR

(75) Inventors: Jin-Hak Kim, Seoul (KR); Tae-Chan Kim, Yongin-si (KR); Bum-Suk Kim, Seoul (KR); Jung-Hoon Jung, Hwaseong-si (KR); Tae-Sub Jung, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 539 days.

(21) Appl. No.: 12/591,074

(22) Filed: Nov. 6, 2009

(65) Prior Publication Data

US 2010/0128149 A1 May 27, 2010

(30) Foreign Application Priority Data

Nov. 24, 2008 (KR) ........................ 10-2008-0116841

(51) Int. Cl.
*H04N 9/07* (2006.01)
*H04N 3/14* (2006.01)
*H04N 5/335* (2011.01)
*H04N 9/04* (2006.01)
*H04N 1/46* (2006.01)
*H01L 31/00* (2006.01)
*G03B 7/099* (2006.01)

(52) U.S. Cl. ........ 348/273; 348/266; 257/440; 358/512; 396/275

(58) Field of Classification Search ........................ None
See application file for complete search history.

(56) References Cited

U.S. PATENT DOCUMENTS

| | | | | |
|---|---|---|---|---|
| RE32,492 E | * | 9/1987 | Takemura | 348/277 |
| 4,939,573 A | * | 7/1990 | Teranishi et al. | 348/276 |
| 6,366,319 B1 | * | 4/2002 | Bills | 348/273 |
| 6,529,239 B1 | * | 3/2003 | Dyck et al. | 348/279 |
| 6,967,748 B1 | * | 11/2005 | Takarada | 358/1.9 |
| 2004/0105021 A1 | * | 6/2004 | Hu | 348/272 |
| 2005/0280911 A1 | * | 12/2005 | Huang et al. | 359/891 |
| 2008/0179641 A1 | * | 7/2008 | Asaba | 257/292 |
| 2008/0211943 A1 | * | 9/2008 | Egawa et al. | 348/294 |
| 2009/0213252 A1 | * | 8/2009 | Kim et al. | 348/280 |

FOREIGN PATENT DOCUMENTS

| | | |
|---|---|---|
| JP | 7-12217 | 2/1995 |
| JP | 07-184216 | 7/1995 |
| JP | 09-090118 | 4/1997 |

* cited by examiner

*Primary Examiner* — Justin P Misleh
(74) *Attorney, Agent, or Firm* — Harness, Dickey & Pierce, P.L.C.

(57) ABSTRACT

A color filter array includes a plurality of white filters, a plurality of yellow filters, a plurality of cyan filters and a plurality of green filters. The plurality of white filters transmits incident light. The plurality of yellow filters transmits a green component and a red component of the incident light. The plurality of cyan filters transmits the green component and a blue component of the incident light. The plurality of green filters transmits the green component of the incident light. An image sensor including the color filter array has high sensitivity and high SNR by increasing transmittance of the incident light.

20 Claims, 4 Drawing Sheets

COLOR FILTER ARRAY, IMAGE SENSOR INCLUDING THE COLOR FILTER ARRAY AND SYSTEM INCLUDING THE IMAGE SENSOR

CROSS-REFERENCE TO RELATED APPLICATION

This application claims priority under 35 U.S.C. §119 to Korean Patent Application No. 2008-0116841, filed on Nov. 24, 2008 in the Korean Intellectual Property Office (KIPO), the contents of which are herein incorporated by reference in their entirety.

BACKGROUND

1. Field

Example embodiments are directed to an image sensing technique, and more particularly to a color filter array having high sensitivity and a system including the same.

2. Description

A complementary metal-oxide semiconductor (CMOS) image sensor (CIS) may have low power consumption, small size and low cost, and may therefore be used instead of a charge-coupled device (CCD) image sensor in an image pickup device or an imaging device. Also, an improved image resolution may be obtained due to the small size of a pixel of the CIS.

However, as the size of the pixel is reduced, the size of a photo diode contained in the CIS is also reduced and the amount of light incident on the pixel decreases, thereby decreasing the number of electrons generated from the photo diode. Therefore, the sensitivity of the image sensor may decrease.

Further, as the size of the pixel is reduced, crosstalk between the neighboring pixels increases. Thus, the signal-to-noise ratio (SNR) of the image sensor may decrease and the color reproducibility of the image sensor gets poor.

A conventional image sensor includes a color filter array having a RGB Bayer pattern. Each of color filters included in the color filter array absorbs a large amount of the incident light and the conventional image sensor may have a low transmittance. Therefore, the conventional image sensor may exhibit low sensitivity and low SNR due to low transmittance.

SUMMARY

Example embodiments are directed to a color filter array including a plurality of white filters, a plurality of yellow filters, a plurality of cyan filters and a plurality of green filters. At least one white filter of the plurality of white filters may transmit at least a portion of incident light, at least one yellow filter of the plurality of yellow filters may transmit a green component and a red component of the incident light, at least one cyan filter of the plurality of cyan filters may transmit the green component and a blue component of the incident light, and at least one green filter of the plurality of green filters may transmit the green component of the incident light.

According to some example embodiments, a ratio of a number of white filters, a number of yellow filters, a number of cyan filters and a number of green filters may be 4:1:1:2.

According to an example embodiment, the color filter array may include a first filter pattern and a second filter pattern. The first filter pattern may include a first white filter, a second white filter, a yellow filter and a first green filter arranged in a 2×2 matrix formation, wherein the first and second white filters are arranged in a first diagonal direction, the yellow filter and the first green filter are arranged in a second diagonal direction. The second filter pattern may include a third white filter, a fourth white filter, a cyan filter and a second green filter arranged in a 2×2 matrix formation, wherein the third and fourth white filters are arranged in the first diagonal direction, the cyan filter and the second green filter are arranged in the second diagonal direction.

According to some example embodiments, the first diagonal direction may be perpendicular to the second diagonal direction.

According to an example embodiment, an image sensor may include the color filter array and a plurality of light detection units. The plurality of light detection units convert light incident on the color filter array into electric signals.

According to an example embodiment, the image sensor may further include a data converting unit. The data converting unit may convert the electric signals output from the plurality of light detection units into electric signals corresponding to a Bayer pattern and to output the converted electric signals.

According to an example embodiment, the image sensor may further include an interpolator. The interpolator may receive the electric signals output from the plurality of light detection units, and may interpolate the electric signals to generate at least one of a white component data, a yellow component data, a cyan component data and a green component data for at least one pixel of the color filter array. The at least one pixel may include at least one light detection unit of the plurality of light detection units and at least one filter of the plurality of filters.

According to some example embodiments, the image sensor may further include a RGB converting unit and a Bayer output unit. The RGB converting unit may convert at least one of the white component data, the yellow component data, the cyan component data and the green component data to generate at least one of an output red component data, an output green component data and an output blue component data. The Bayer output unit may receive at least one of the output red component data, the output green component data and the output blue component data from the RGB converting unit and may convert at least one of the output red component data, the output green component data and the output blue component data into electric signals including data corresponding to a Bayer pattern.

According to an example embodiment, the RGB converting unit may include a first RGB converter, a noise reduction unit, a luminance generator and a second RGB converter. The first RGB converter may generate a first red component data based on the white component data and the cyan component data, a first green component data based on the green component data and a first blue component data based on the white component data and the yellow component data. The noise reduction unit may reduce noise in the first red component data, the first green component data and the first blue component data to generate a second red component data, a second green component data and a second blue component data. The luminance generator may generate luminance data based on the white component data, the yellow component data and the cyan component data. The second RGB converter may generate the output red component data, the output green component data and the output blue component data based on the second red component data, the second green component data, the second blue component data and the luminance data.

According to an example embodiment, the first RGB converter may be further configured to generate the first red component by subtracting the cyan component data from the white component data and to generate the first blue component data by subtracting the yellow component data from the white component data.

According to an example embodiment, the luminance data may satisfy an equation Y=WD+1.1YED+0.4CD, wherein Y represents luminance data, WD represents the white component data, YED represents the yellow component data and CD represents the cyan component data.

According to an example embodiment, the output red component data may satisfy an equation ROUT=Y*RD2/(RD2+GD2+BD2), the output green component may satisfy an equation GOUT=Y*GD2/(RD2+GD2+BD2) and the output blue component data may satisfy an equation BOUT=Y*BD2/(RD2+GD2+BD2), wherein ROUT represents the output red component data, GOUT represents the output green component data, BOUT represents the output blue component data, Y represents luminance data, RD2 represents the second red component data, GD2 represents the second green component data and BD2 represents the second blue component data.

According to another example embodiment, the image sensor may further include a row driver, a correlated double sampling (CDS) circuit, a ramp generator, a comparator, an analog-to-digital converter (ADC) and a timing controller. The row driver may be coupled to the plurality of light detection units in a row direction and configured to generate a driving signal to drive the plurality of light detection units. The correlated double sampling (CDS) circuit may be coupled to the plurality of light detection units in a column direction and configured to perform correlated double sampling operation based on the electric signals output from the plurality of light detection units. The ramp generator may generate a ramp signal. The comparator may compare an output signal of the CDS circuit with the ramp signal. The ADC may convert an output signal of the comparator into a digital signal. The timing controller may provide a timing control signal to the row driver, the CDS circuit, the ramp generator, the comparator and the ADC.

According to some example embodiments, a system may include the image sensor and a digital signal processor that may receive the electric signals from the image sensor and configured to process the electric signal to form an image.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited, by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
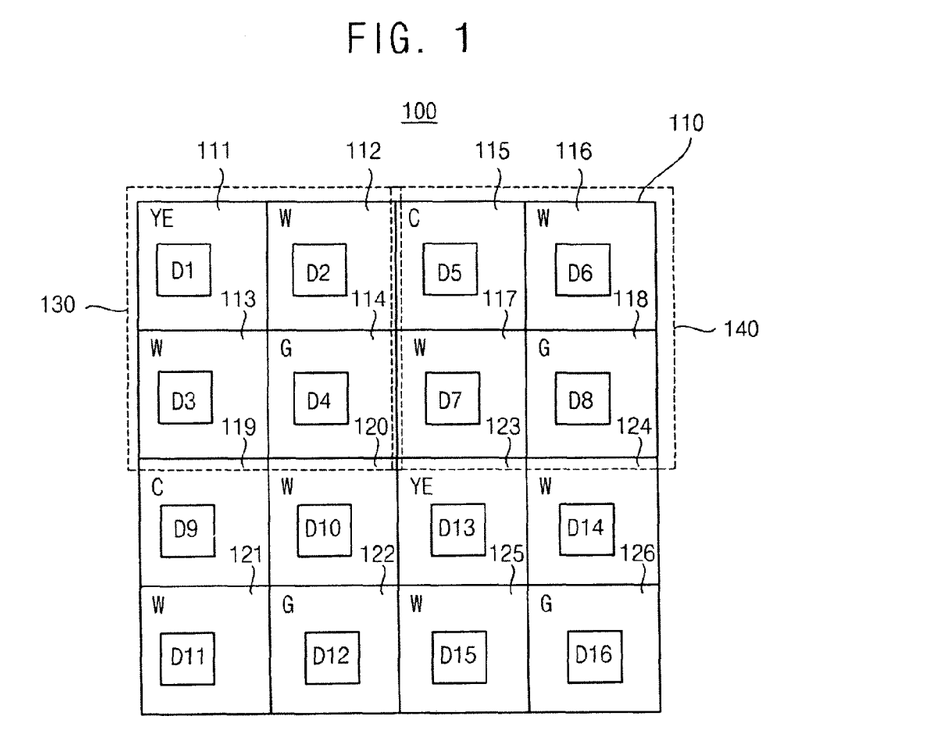
FIG. 1 illustrates an image sensor according to an example embodiment.

FIG. 1 illustrates an example embodiment of an image sensor 100 including a color filter array 110 and a plurality of light detection units D1-D16.

The color filter array 110 includes a plurality of filters 111-126 that transmit incident light in whole or in part. Although FIG. 1 illustrates the color filter array 110 including 16 filters, the number of filters is not limited thereto. The color filter array 110 may include a plurality of white filters 112, 113, 116, 117, 120, 121, 124 and 125, a plurality of yellow filters 111 and 123, a plurality of cyan filters 115 and 119 and a plurality of green filters 114, 118, 122 and 126. Each of the white filters 112, 113, 116, 117, 120, 121, 124 and 125 transmits the incident light. Each of the yellow filters 111 and 123 transmits a green component and a red component of the incident light. Each of the cyan filters 115 and 119 transmits the green component and a blue component of the incident light. Each of the green filters 114, 118, 122 and 126 transmits the green component of the incident light.

In an example embodiment, a ratio of a number of white filters 112, 113, 116, 117, 120, 121, 124 and 125, a number of yellow filters 111 and 123, a number of cyan filters 115 and 119 and a number of green filters 114, 118, 122 and 126 included in the color filter array 110 may be 4:1:1:2.

In an example embodiment, the color filter array 110 may include a first filter pattern 130 and a second filter pattern 140. Each of the first and second filter patterns 130 and 140 may include 4 filters corresponding to 4 pixels such that the 4 filters are arranged in a 2×2 square matrix formation. For example, in the first filter pattern 130, the first white filter 112 and the second white filter 113 may be arranged in a first diagonal direction and the yellow filter 111 and the first green filter 114 may be arranged in a second diagonal direction. In the second filter pattern 140, the third white filter 116 and the fourth white filter 117 may be arranged in the first diagonal direction, the cyan filter 115 and the second green filter 118 may be arranged in the second diagonal direction. The second diagonal direction may be perpendicular to the first diagonal direction. However, configuration of the first filter pattern 130 and the second filter pattern 140 is not limited thereto and a variety of configurations are possible, as will be obvious to one of ordinary skills in the art.

In the color filter array 110, the first filter pattern 130 and the second filter pattern 140 may be alternately arranged. For example, the first filter pattern 130 and the second filter pattern 140 may be alternately arranged in a first direction and in a second direction being perpendicular to the first direction. For example, the first filter pattern 130 and the second filter pattern 140 may be alternately arranged in rows and/or columns. For example, the first filter pattern 130 may be adjacent to the upper, lower, left and/or right side of the second filter pattern 140. The second filter pattern 140 may be adjacent to the upper, lower, left and/or right side of the first filter pattern 130. The direction in which the first and second white filters 112 and 113 are arranged in the first filter pattern 130 and the direction in which the third and fourth white filters 116 and 117 are arranged in the second filter pattern 140 may be the same or may be perpendicular to each other according to some example embodiments.

In FIG. 1, the first white filter 112, the second white filter 113, the yellow filter 111 and the first green filter 114 may be arranged on the second light detection unit D2, the third light detection unit D3, the first light detection unit D1 and the fourth light detection D4, respectively. In another example embodiment, the first white filter 112 may be arranged on the first light detection unit D1, the second white filter 113 may be arranged on the fourth light detection unit D4, the yellow filter 111 may be arranged on the second light detection unit D2 and the first green filter 114 may be arranged on the third light detection unit D3. In FIG. 1, the third white filter 116, the fourth white filter 117, the cyan filter 115 and the second green filter 118 may be arranged on the sixth light detection unit D6, the seventh light detection unit D7, the fifth light detection unit D5 and the eighth light detection unit D8, respectively. In another example embodiment, the third white filter 116 may be arranged on the fifth light detection unit D5, the fourth white filter 117 may ay be arranged on the eighth light detection unit D8, the cyan filter 115 may be arranged on the sixth light detection unit D6 and the second green filter 118 may be arranged on the seventh light detection unit D7.

The plurality of light detection units D1-D16 convert light incident on the color filter array 110 into electric signals. For example, each of the light detection units D1-D16 may include a photo diode, a photo transistor, a photo gate, a pinned photo diode (PDD) or a combination thereof (not shown). The image sensor 100 may include a plurality of pixels. Each pixel may include one of the plurality of light detection units D1-D16 and one of the plurality of filters 111-126 corresponding to the one of the plurality of light detection units D1-D16. For example, a first pixel may include the first light detection unit D1 and the yellow filter 111. In an example embodiment, each of the pixels may further include a 4-transistor structure (not shown) that may have a transfer transistor, a reset transistor, a drive transistor and a select transistor. However, each pixel may alternatively include 1-transistor structure, 3-transistor structure or 5-transistor structure, according to some example embodiments. In another example embodiment, the pixels may share some transistors.

Each of the light detection units D1-D16 may convert light incident on a corresponding one of the plurality of filters 111-126 into the electric signals. For example, the first light detection unit D1 may convert yellow component of light incident on the yellow filter 111 into a first electric signal. The yellow component of the light incident on the yellow filter 111 includes the green component and the red component of the incident light. The second light detection unit D2 may convert white component of light incident on the first white filter 112 into a second electric signal. The white component of the light incident on the first white filter 112 includes the entire component of the incident light. The fourth light detection unit D4 may convert the green component of the incident light incident on the first filter 114 into a fourth electric signal. The fifth light detection unit D5 may convert cyan component of light incident on the cyan filter 115 into a fifth electric signal. The cyan component of the light incident on the cyan filter 115 includes the green component and the blue component of the incident light.

The transmittance of the color filter array 110 may be higher than the transmittance of a conventional color filter array that transmits only one of the red, green and blue components of the incident light. Thus, the sensitivity of the plurality of light detection units D1-D16 and the Signal-to-Noise Ratio (SNR) of the image sensor 100 may be improved.

Figure 2:
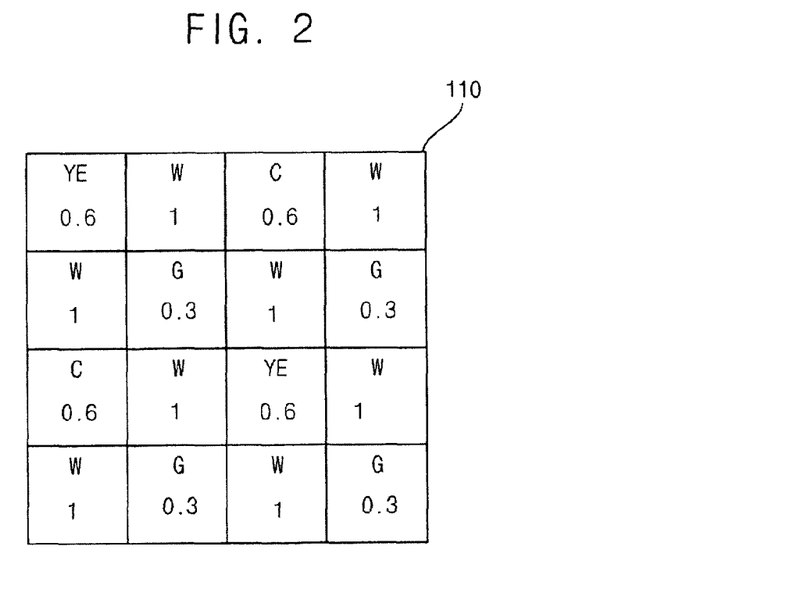
FIG. 2 illustrates transmittance of the color filter array included in the image sensor of FIG. 1.

FIG. 2 is a diagram illustrating transmittance of the color filter array 110 included in the image sensor 100 of FIG. 1.

White filters W may transmit the incident light in its entirety (entire frequency spectrum, for e.g.). If the transmittance of the white filters W is about 1, yellow filters YE and cyan filters C may have a transmittance ranging from about 0.6 to about 0.7 and green filters G have a transmittance ranging from about 0.3 to about 0.4. Here, the transmittance indicates the relative intensity of transmitted light to the incident light in a visible light region. The transmittance of the yellow filters YE and the cyan filters C may be about twice higher than the transmittance of the green filters G because the yellow filters YE transmit two components (i.e., the red and green components) of the incident light, the cyan filters C transmit two components (i.e., the green and blue components) of the incident light and the green filters G transmit one component (i.e., the green component) of the incident light.

A conventional color filter array that includes RGB Bayer pattern transmits only one of the red, green and blue components of the incident light. The transmittance of the conventional color filter array is about 0.3. In contrast, transmittance of the color filter array 110 is about 0.73. Thus, the sensitivity and the SNR of the image sensor 100 may be improved.

Figure 3:
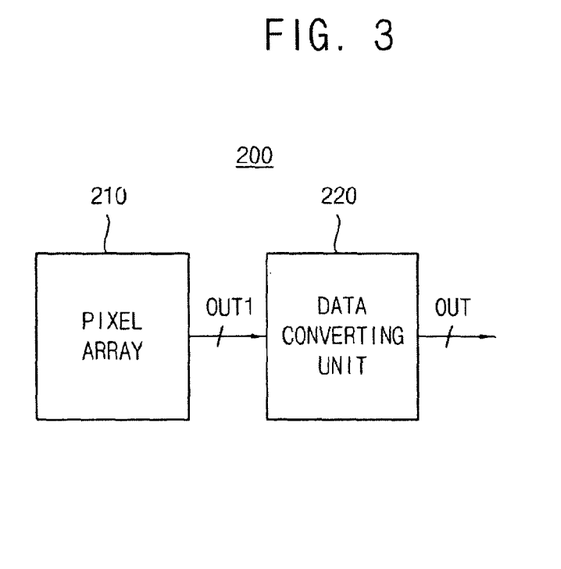
FIG. 3 is a block diagram illustrating an image sensor according to an example embodiment.

FIG. 3 is a block diagram illustrating an image sensor according to an example embodiment.

Referring to FIG. 3, the image sensor 200 may include a pixel array 210 and a data converting unit 220.

The pixel array 210 may include the color filter array 110 and the plurality of light detection units D1-D16 of FIG. 1. In an example embodiment, the pixel array 210 may include a plurality of pixels such that each pixel may include a single color filter and single light detection unit. In an example embodiment, each pixel included in the pixel array 210 may further include a transfer transistor, a reset transistor, a drive transistor and/or a select transistor (not shown). The pixel array 210 may transmit the incident light in whole or in part. The plurality of light detection units D1-D16 contained in the pixel array 210 may convert the light passing through the pixel array 210 into electric signals OUT1. The pixel array 210 outputs the electric signals OUT1. For example, the electric signals OUT1 may include image data corresponding to each of the pixels. The image data corresponding to each of the pixels may include one of white component data, yellow component data, cyan component data and green component data.

The data converting unit 220 may receive the electric signals OUT1 output from the pixel array 210. The data converting unit 220 may convert the electric signals OUT1 into electric signals OUT corresponding to a Bayer pattern and may output the electric signals OUT. For example, the electric signals OUT may include image data corresponding to each of the pixels. The image data corresponding to each of the pixels may include one of red component data, green component data and blue component data. In an example embodiment, a ratio of the red component data, the green component data and the blue component data included in the electric signals OUT may be 1:2:1.

The image sensor 200 may include the color filter array having high transmittance, and thus the sensitivity and the SNR of the image sensor 200 may be improved. In addition, the image sensor 200 outputs the electric signals OUT corresponding to the conventional Bayer pattern, and thus the image sensor 200 may also be used in a conventional image signal processor (ISP).

Figure 4:
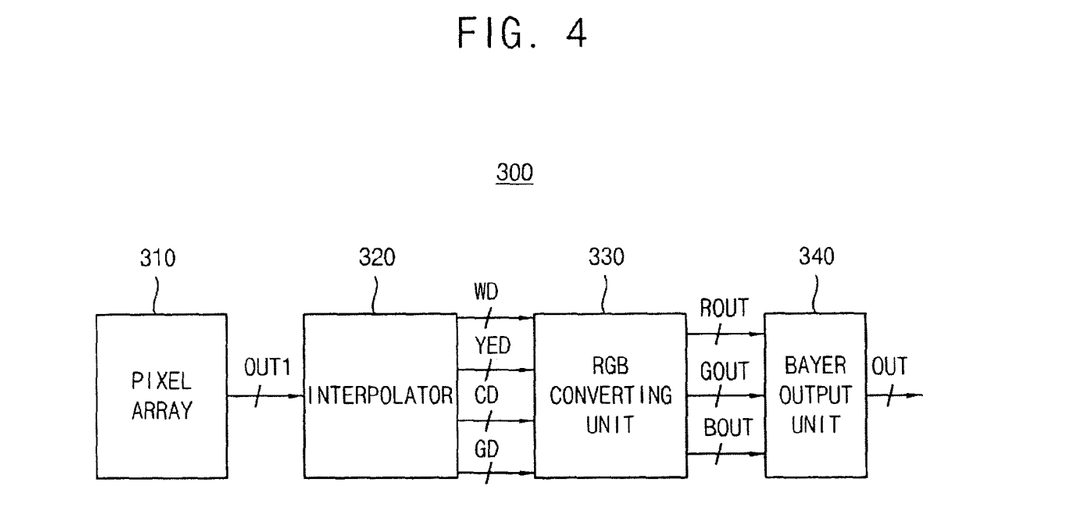
FIG. 4 is a block diagram illustrating an image sensor according to another example embodiment.

FIG. 4 is a block diagram illustrating an image sensor according to another example embodiment.

Referring to FIG. 4, the image sensor 300 may include a pixel array 310, an interpolator 320, a RGB converting unit 330 and a Bayer output unit 340.

The pixel array 310 may include the color filter array 110 and the plurality of light detection units D1-D16 of FIG. 1 and the plurality of light detection units D1-D16 of FIG. 1. The pixel array 310 may output electric signals OUT1 for each of pixels such that the electric signals OUT1 includes one of white component data, yellow component data, cyan component data and green component data.

The interpolator 320 may receive the electric signals OUT1 from the pixel array 310. The interpolator 320 may perform interpolation on the electric signals OUT1 to generate white component data WD, yellow component data YED, cyan component data CD and green component data GD for each of the pixels included in the pixel array 310. For example, the interpolator 320 may perform interpolation by a bilinear interpolation method, a bicubic interpolation method, or the like.

The RGB converting unit 330 may receive the white component data WD, the yellow component data YED, the cyan component data CD and the green component data GD from the interpolator 320. The RGB converting unit 330 may convert the white component data WD, the yellow component data YED, the cyan component data CD and the green component data GD into output red component data ROUT, output green component data GOUT and output blue component data BOUT. The RGB converting unit 330 may output the output red component data ROUT, the output green component data GOUT and the output blue component data BOUT for each of the pixels included in the pixel array 310.

The Bayer output unit 340 may receive the output red component data ROUT, the output green component data GOUT and the output blue component data BOUT from the RGB converting unit 330. The Bayer output unit 340 may convert the output red component data ROUT, the output green component data GOUT and the output blue component data BOUT into electric signals OUT that includes data corresponding to a Bayer pattern. For example, the Bayer output unit 340 may output one of the output red component data ROUT, the output green component data GOUT and the output blue component data BOUT for each of the pixels included in the pixel array 310.

The image sensor 300 includes the color filter array having high transmittance, and thus the sensitivity and the SNR of the image sensor 300 may be improved. In addition, the image sensor 300 outputs the electric signals OUT corresponding to the conventional Bayer pattern, and thus the image sensor 300 may be used in a conventional image signal processor (ISP).

Figure 5:
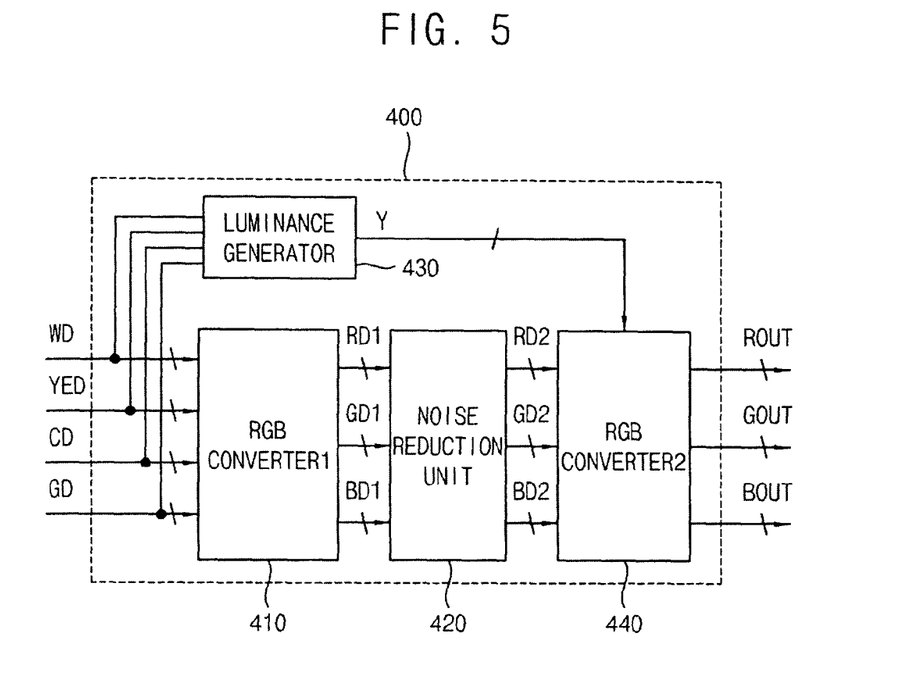
FIG. 5 is a block diagram illustrating the RGB converting unit included in the image sensor of FIG. 4.

FIG. 5 is a block diagram illustrating a RGB converting unit included in the image sensor 300 of FIG. 4.

Referring to FIG. 5, the RGB converting unit 400 may include a first RGB converter 410, a noise reduction unit 420, a luminance generator 430 and a second RGB converter 440.

The first RGB converter 410 may receive the white component data WD, the yellow component data YED, the cyan component data CD and the green component data GD of each of the pixels from the interpolator 320 of FIG. 4. For example, the first RGB converter 410 may generate first red component data RD 1 based on the white component data WD and the cyan component data CD, may generate first green component data GD 1 based on the green component data GD, and may generate first blue component data BD 1 based on the white component data WD and the yellow component data YED. For example, the first RGB converter 410 may generate the first red component data RD 1 by subtracting the cyan component data CD from the white component data WD and may generate the first blue component data BD 1 by subtracting the yellow component data YED from the white component data WD. The first RGB converter 410 may output the green component data GD as the first green component data GD 1.

The noise reduction unit 420 may receive the first red component data RD1, the first green component data GD1 and the first blue component data BD1 from the first RGB converter 410. The noise reduction unit 420 may reduce the noise in the first red component data RD1, the first green component data GD1 and the first blue component data BD1 to generate second red component data RD2, second green component data GD2 and second blue component data BD2. For example, the noise reduction unit 420 may reduce spatial noise included in the first red component data RD1, the first green component data GD1 and the first blue component data BD 1.

The luminance generator 430 may receive at least one of the white component data WD, the yellow component data YED, the cyan component data CD and the green component data GD of each of the pixels from the interpolator of FIG. 4. In an example embodiment, the luminance generator 430 may generate luminance data Y based on the white component data WD, the yellow component data YED and the cyan component data CD. For example, the luminance generator 430 may generate the luminance data Y in accordance with the Equation 1.

$$Y=WD+1.1\ YED+0.4\ CD \qquad \text{[Equation 1]}$$

The second RGB generator converter 440 may receive the second red component data RD2, the second green component data GD2 and the second blue component data BD2 from the noise reduction unit 420 and may receive the luminance data Y from the luminance generator 430. The second RGB converter 440 may generate the output red component data ROUT, the output green component data GOUT and the output blue component data BOUT based on the second red component data RD2, the second green component data GD2, the second blue component data BD2 and the luminance data Y. For example, the second RGB converter 440 may generate the output red component data ROUT, the output green component data GOUT and the output blue component data BOUT in accordance with the Equation 2, Equation 3 and Equation 4, respectively.

$$ROUT=Y*RD2/(RD2+GD2+BD2) \qquad \text{[Equation 2]}$$

$$GOUT=Y*GD2/(RD2+GD2+BD2) \qquad \text{[Equation 3]}$$

$$BOUT=Y*BD2/(RD2+GD2+BD2) \qquad \text{[Equation 4]}$$

Thus, the RGB converting unit 400 may output the red, green and blue component data of which the noise is reduced for each of the pixels. In addition, the luminance data Y generated based on the white component data WD, the yellow component data YED and the cyan component data CD may have high resolution because the white component data WD, the yellow component data YED and the cyan component data CD include higher luminance information.

Figure 6:
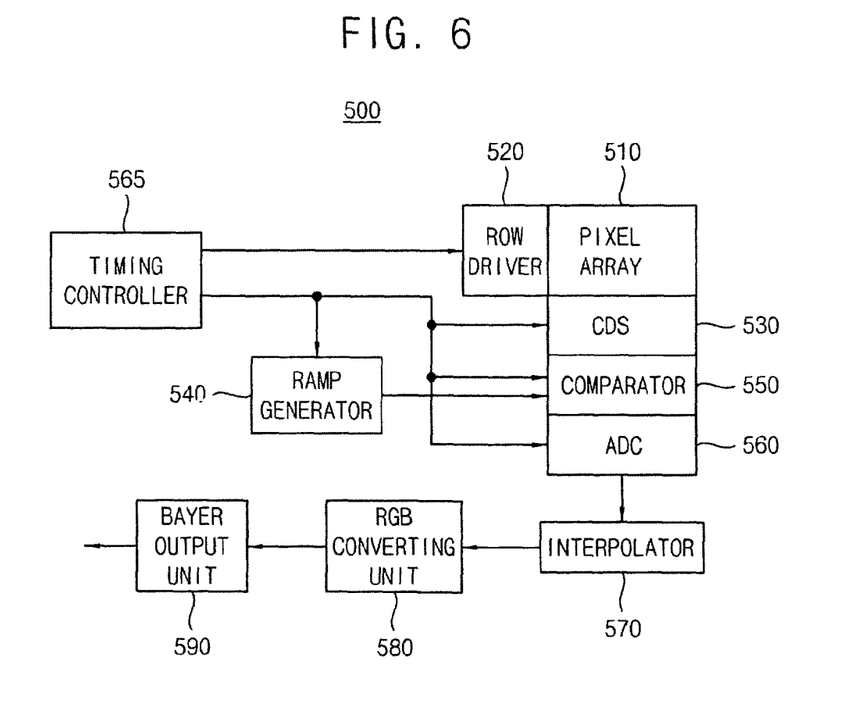
FIG. 6 is a block diagram illustrating an image sensor according to an example embodiment.

FIG. 6 is a block diagram illustrating an image sensor according to another example embodiment.

Referring to FIG. 6, the image sensor 500 includes a pixel array 510, a row driver 520, a correlated double sampling (CDS) circuit 530, a ramp generator 540, a comparator 550, an analog-to-digital converter (ADC) 560, a timing controller 565, an interpolator 570, a RGB converting unit 580 and a Bayer output unit 590.

The pixel array 510 may include the color filter array 110 and the plurality of light detection units D1-D16 of FIG. 1 and the plurality of light detection units D1-D16 of FIG. 1. In an example embodiment, the pixel array 510 may further include a micro lens array (not shown).

The row driver 520 may be coupled to each row of the pixel array 510 and may generate a driving signal (not shown) that drives each row of the pixel array 510. For example, the row driver 520 may select a plurality of pixels included in the pixel array 510 on a row-by-row basis.

The CDS circuit 530 may be coupled to each column of the pixel array 510 and may perform CDS operation in response to the electric signals output from the plurality of light detection units D1-D16. The ramp generator 540 may generate a ramp signal and may provide the ramp signal to the comparator 550. The comparator 550 may compare an output signal of the CDS circuit 530 with the ramp signal output from the ramp generator 540. The ADC 560 may convert an output signal of the comparator 550 into a digital signal. The ADC 560 may generate a digital signal corresponding to incident light into the pixel array 510.

The timing controller 565 may control timing operation for the row driver 520, the CDS circuit 530, the ramp generator 540, the comparator 550 and the ADC 560. For example, the timing controller 565 may provide a timing signal and a control signal to the row driver 520, the CDS circuit 530, the ramp generator 540, the comparator 550 and the ADC 560.

The interpolator 570 may perform interpolation on an output signal of the ADC to generate white component data, yellow component data, cyan component data and green component data for each of the pixels included in the pixel array 510. The RGB converting unit 580 may convert the white component data, the yellow component data, the cyan component data and the green component data into output red component data, output green component data and output blue component data. The Bayer output unit 590 may receive the output red component data, the output green component data and the output blue component data for each pixel of the color filter array and may output image data corresponding to a Bayer pattern.

The image sensor 500 includes the color filter array having high transmittance, and thus the sensitivity image sensor 500 may exhibit improved and the SNR. In addition, the image sensor 500 may output the image data corresponding to the conventional Bayer pattern, and thus the image sensor 500 may also be used in a conventional image signal processor (ISP).

Figure 7:
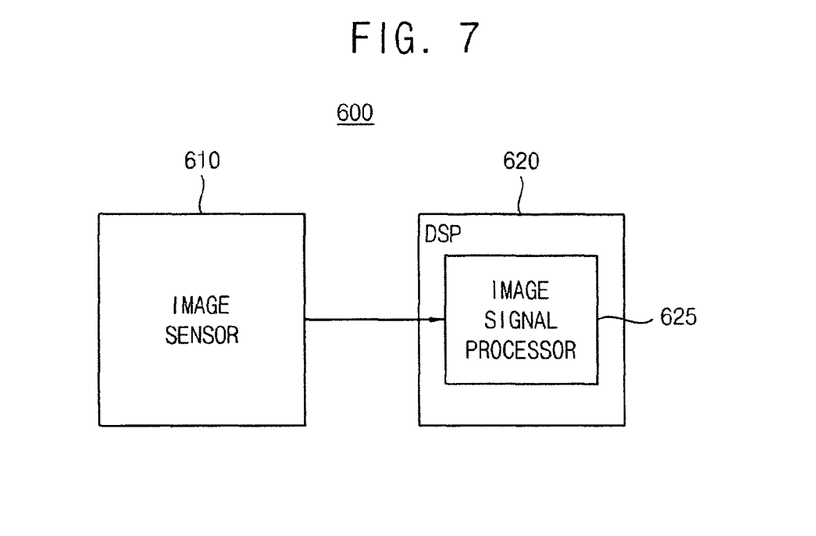
FIG. 7 is a block diagram illustrating a system according to an example embodiment.

FIG. 7 is a block diagram illustrating a system according to an example embodiment.

Referring to FIG. 7, the system 600 may include an image sensor 610 and a digital signal processor (DSP) 620.

The image sensor 610 may include the image sensor 100 of FIG. 1, the image sensor 200 of FIG. 3, the image sensor 300 of FIG. 4 or the image sensor 500 of FIG. 6. The image sensor 610 may output image data corresponding to incident light. The image sensor 610 may output image data corresponding to the Bayer pattern.

The digital signal processor 620 may include an image signal processor 625. The image signal processor 625 may receive the image data corresponding to the Bayer pattern from the image sensor 610. Thus, the design time for the system 600 may be reduced, since a conventional image signal processor may be used as the image signal processor 625. In an example embodiment, the digital signal processor 620 may further include input/output (I/O) interface (not shown) communicable with an external device (not shown) such as a computer, a monitor, or the like.

The image sensor 610 and the digital signal processor 620 may be fabricated as one integrated circuit chip or may be fabricated as two separate integrated circuit chips, according to some example embodiments. In an example embodiment, the system 600 may further include an interface driver (now shown) for communicating with the external device and/or a micro computer (not shown) for controlling the digital signal processor 620.

For example, the system 600 may include a computer system, a camera system, a scanner, a navigation system used in a vehicle, a video phone, a surveillance system, an auto-focus system, a tracking system, a motion sensing system, an image stabilizing system and/or any other systems that may use the image sensor.

Figure 8:
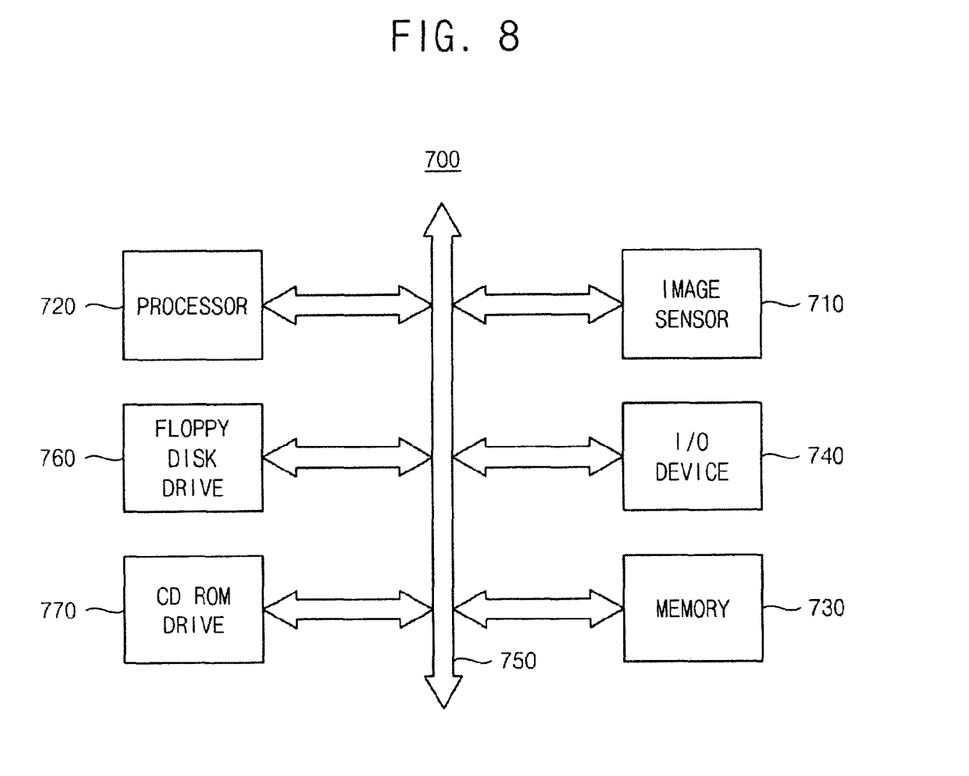
FIG. 8 is a block diagram illustrating a system according to another example embodiment.

FIG. 8 is a block diagram illustrating a system according to another example embodiment.

Referring to FIG. 8, the system 700 includes an image sensor 710. The system 700 may further include a data processor 720, a memory 730, an I/O device 740 and a bus 750. The system 700 may also include a floppy disk drive 760 and a CD ROM drive 770. However, additional components, as will be obvious to one of ordinary skill in the art, may also be included in the system 700.

The system 700, for example, a processor-based computer system, may include the data processor 720 such as a microprocessor or a central processing unit (CPU) such that the data processor 720 communicates with the I/O device 740 using the bus 750. The image sensor 710 may communicate using the bus 750 or a similar communication link. In addition, the memory 730, the floppy disk drive 760 and/or the CD ROM drive 770 further included in the system 700, may communicate with the a data processor 720 through the bus 750. The system 700 may further include a port that is may communicate with a video card, a sound card, a memory card, a USB device and/or the other systems. In an example embodiment, the image sensor 710 may be integrated with a microprocessor, a CPU, a digital signal processor and/or the memory 730. In another example embodiment, the image sensor 710 and the data processor 720 may be fabricated as two separate integrated circuit chips.

For example, the system 700 may include a computer system, a camera system, a scanner, a navigation system used in a vehicle, a video phone, a surveillance system, an auto-focus system, a tracking system, a motion sensing system, an image stabilizing system, or the like.

As described above, the image sensor and the system including the image sensor, according to some example embodiments, may use the color filter array having high transmittance and thus may improve the sensitivity and the SNR. In addition, the conventional image signal processor (ISP) may be used because the image sensor outputs the image data corresponding to a conventional Bayer pattern.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A color filter array, comprising:
   a plurality of white filters;
   a plurality of yellow filters;
   a plurality of cyan filters; and
   a plurality of green filters;
   wherein at least one white filter of the plurality of white filters is configured to transmit at least a portion of incident light,
   wherein at least one yellow filter of the plurality of yellow filters is configured to transmit a green component and a red component of the incident light,
   wherein at least one cyan filter of the plurality of cyan filters is configured to transmit the green component and a blue component of the incident light,
   wherein at least one green filter of the plurality of green filters is configured to transmit the green component of the incident light, and
   wherein a ratio of a number of white filters, a number of yellow filters, a number of cyan filters, and a number of green filters is 4:1:1:2, respectively.

2. An image sensor, comprising:
   the color filter array of claim 1; and
   a plurality of light detection units configured to convert the light incident on the color filter array into electric signals.

3. The image sensor of claim 2, further comprising:
   a data converting unit configured to convert the electric signals output from the plurality of light detection units into electric signals corresponding to a Bayer pattern and to output the converted electric signals.

4. The image sensor of claim 2, further comprising:
   an interpolator configured to receive the electric signals output from the plurality of light detection units, and configured to interpolate the electric signals to generate at least one of white component data, yellow component data, cyan component data, and green component data for at least one pixel of the color filter array;
   wherein the at least one pixel includes at least one light detection unit of the plurality of light detection units and at least one filter of the plurality of white filters, the plurality of yellow filters, the plurality of cyan filters, and the plurality of green filters.

5. The image sensor of claim 4, further comprising:
   a red, green, blue (RGB) converting unit configured to convert at least one of the white component data, the yellow component data, the cyan component data, and the green component data to generate at least one of an output red component data, an output green component data, and an output blue component data; and
   a Bayer output unit configured to receive at least one of the output red component data, the output green component data, and the output blue component data from the RGB converting unit and configured to convert at least one of the output red component data, the output green component data, and the output blue component data into electric signals including data corresponding to a Bayer pattern.

6. The image sensor of claim 5, wherein the RGB converting unit includes:
   a first RGB converter configured to generate first red component data based on the white component data and the cyan component data, first green component data based on the green component data, and first blue component data based on the white component data and the yellow component data;
   a noise reduction unit configured to reduce noise in the first red component data, the first green component data, and the first blue component data to generate second red component data, second green component data, and second blue component data;
   a luminance generator configured to generate luminance data based on the white component data, the yellow component data, and the cyan component data; and
   a second RGB converter configured to generate the output red component data, the output green component data, and the output blue component data based on the second red component data, the second green component data, the second blue component data, and the luminance data.

7. The image sensor of claim 6, wherein the first RGB converter is further configured to generate the first red component data by subtracting the cyan component data from the white component data, and to generate the first blue component data by subtracting the yellow component data from the white component data.

8. The image sensor of claim 6, wherein the luminance data satisfies an equation $Y = WD + 1.1\ YED + 0.4\ CD$, wherein Y represents the luminance data, WD represents the white component data, YED represents the yellow component data, and CD represents the cyan component data.

9. The image sensor of claim 6, wherein the output red component data satisfies an equation $ROU=Y* RD2 /(RD2+GD2+BD2)$, wherein the output green component data satisfies an equation $GOUT=Y* GD2/(RD2+GD2+BD2)$, wherein the output blue component data satisfies an equation $BOUT=Y * BD2/(RD2+GD2+BD2)$, and wherein ROUT represents the output red component data, GOUT represents the output green component data, BOUT represents the output blue component data, Y represents the luminance data, RD2 represents the second red component data, GD2 represents the second green component data, and BD2 represents the second blue component data.

10. The image sensor of claim 2, further comprising:

a row driver coupled to the plurality of light detection units in a row direction and configured to generate a driving signal to drive the plurality of light detection units;

a correlated double sampling (CDS) circuit coupled to the plurality of light detection units in a column direction and configured to perform correlated double sampling operation based on the electric signals output from the plurality of light detection units;

a ramp generator configured to generate a ramp signal;

a comparator configured to compare an output signal of the CDS circuit with the ramp signal;

an analog-to-digital converter (ADC) configured to convert an output signal of the comparator into a digital signal; and a timing controller configured to provide a timing control signal to the row driver, the CDS circuit, the ramp generator, the comparator, and the ADC.

11. The image sensor of claim 10, further comprising:

an interpolator configured to interpolate the signal output from the ADC to generate at least one of white component data, yellow component data, cyan component data, and green component data for at least one pixel of the color filter array;

a red, green, blue (RGB) converting unit configured to convert at least one of the white component data, the yellow component data, the cyan component data, and the green component data to generate at least one of output red component data, output green component data, and output blue component data; and a Bayer output unit configured to receive at least one of the output red component data, the output green component data, and the output blue component data and configured to output electric signals including data corresponding to a Bayer pattern.

12. A system, comprising:

the image sensor of claim 2; and a digital signal processor configured to receive the electric signals from the image sensor and configured to process the electric signals to form an image.

13. A color filter array, comprising:

a plurality of white filters;
a plurality of yellow filters;
a plurality of cyan filters;
a plurality of green filters;

a first filter pattern including a first white filter, a second white filter, a yellow filter, and a first green filter arranged in a 2×2 matrix formation, wherein the first and second white filters are arranged in a first diagonal direction, and wherein the yellow filter and the first green filter are arranged in a second diagonal direction; and a second filter pattern including a third white filter, a fourth white filter, a cyan filter, and a second green filter arranged in a 2×2 matrix formation, wherein the third and fourth white filters are arranged in the first diagonal direction, and wherein the cyan filter and the second green filter are arranged in the second diagonal direction;

wherein at least one white filter of the plurality of white filters is configured to transmit at least a portion of incident light, wherein at least one yellow filter of the plurality of yellow filters is configured to transmit a green component and a red component of the incident light, wherein at least one cyan filter of the plurality of cyan filters is configured to transmit the green component and a blue component of the incident light, wherein at least one green filter of the plurality of green filters is configured to transmit the green component of the incident light.

14. The color filter array of claim 13, wherein the first diagonal direction is perpendicular to the second diagonal direction.

15. An image sensor, comprising:

the color filter array of claim 14; and a plurality of light detection units configured to convert the light incident on the color filter array into electric signals.

16. The image sensor of claim 15, further comprising:

a data converting unit configured to convert the electric signals output from the plurality of light detection units into electric signals corresponding to a Bayer pattern and to output the converted electric signals.

17. A system, comprising:

the image sensor of claim 15; and a digital signal processor configured to receive the electric signals from the image sensor and configured to process the electric signals to form an image.

18. An image sensor, comprising:

the color filter array of claim 13; and a plurality of light detection units configured to convert the light incident on the color filter array into electric signals.

19. The image sensor of claim 18, further comprising:

a data converting unit configured to convert the electric signals output from the plurality of light detection units into electric signals corresponding to a Bayer pattern and to output the converted electric signals.

20. A system, comprising:

the image sensor of claim 18; and a digital signal processor configured to receive the electric signals from the image sensor and configured to process the electric signals to form an image.

* * * * *